3,350,230
FUEL CELL HAVING SOLID STABILIZED ZIRCONIUM OXIDE ELECTROLYTE
Helmut Tannenberger and Herbert Schachner, Geneva, and Wolfgang Simm, Lausanne, Switzerland, assignors to Compagnie Francaise de Raffinage, Paris, France
No Drawing. Filed May 6, 1963, Ser. No. 278,416
Claims priority, application Switzerland, May 7, 1962
5,474/62
5 Claims. (Cl. 136—86)

This invention relates to fuel-cell batteries having solid instead of liquid electrolyte materials and, more particularly, to metal oxide mixtures for such fuel-cell electrolytes having enhanced electrical, chemical, and thermal properties.

As will be understood, fuel-cell batteries of the character to which this invention relates are utilized for the production of electricity by interaction of an oxidizable or fuel gas and an oxidizing gas directly from such reaction instead of actually burning the fuel gas to produce heat and then utilizing the heat as energy to be converted mechanically into electric current. Generally, such fuel cells include two electrodes (anode and cathode) separated by an electrolyte in the reaction chamber. The electrolyte may be either liquid (such as an aqueous solution or molten salt) or a solid, and it is to such fuel cells having solid electrolytes to which this invention particularly relates.

As will be understood, a number of recognized or theoretical advantages are to be obtained using solid electrolytes in fuel cells. Fro example, such advantages include the possibility of utilization of the cell at more elevated temperatures for hydrocarbon fuels, the minimizing of corrosion problems, the simplicity of solid construction, the chemical stability of the electrolyte materials, the independence from effects of gravity, etc. Nevertheless, the utilization of such advantages, particularly on industrial scales, has not been practicable because, for example, various possible electrolyte materials possess one or more inherent characteristics which, under the usual conditions in use, interfere with satisfactory operations or even present technical disadvantages which outweigh the theoretical advantages to be gained from solid electrolytes in the first place. Stated otherwise, a variety of materials may be available or have been proposed for such purposes, yet none of them includes all the different characteristics necessary or desirable for the successful utilization of cells on industrial or commercial scale. Thus, certain materials lack chemical stability under the conditions of use, others have too little ionic conductivity or too great electronic conductivity, still others have a cationic conductivity leading to their excessive wear and even destruction after only a short time, etc.

According to this invention, however, materials and techniques are provided for forming solid electrolyte materials for such fuel cells to obtain the various advantages and enhanced results possible from solid materials while also avoiding the above noted disadvantages or impracticalities of solid electrolyte materials heretofore proposed for such uses; and such materials in accordance herewith include ternary metal oxide mixtures of zirconium oxide with minor portions of calcium and magnesium oxides, and optionally with the addition of another material such as beryllium oxide as an aid in the sintering or fabrication of the electrolyte portion of the cell.

With the foregoing and additional objects in view, this invention will be described in more detail, and other objects and advantages will be apparent from the following description and the appended claims.

A variety of metal oxide materials have been proposed as appropriate for such uses as forming fuel piles of the character to which this invention relates, and even including mixtures of two oxides. For example, the utilization of a mixture of zirconium oxide with, alternatively, either calcium or magnesium oxides may, in some situations, produce relatively satisfactory results, although also presenting some substantial disadvantages or impracticality particularly on industrial or commercial scale use. Thus, an oxide mixture composed of 88% $ZrO_2$ and 12% $CaO$ has an inherent and quite high resistivity of the order of about 220 ohm cm. when it is heated up to the neighborhood of 800° C.—i.e., a temperature range where it may usually be desired for the cell to function. Similarly, a mixture composed of 86% $ZrO_2$ and 14% $MgO$ may have a favorable or satisfactory resistivity when arranged in a structure of the type of calcium fluoride, which can be obtained by heating to high temperatures in a neighborhood of 1500° C. and rapidly cooling; yet such structure is not stable at temperatures of around 800° C. where the cell is to be used, and is transformed at that temperature range at least partially into a tetragonal and monoclinic structure, which not only renders the material quite friable, but also introduces a substantial and impractical increase in the resistivity.

Such difficulties are eliminated with the materials in accordance herewith, however, by the utilization of ternary mixtures of the oxides of zirconium, calcium, and magnesium. Apparently the advantages of mixtures and materials in accordance herewith are rather closely dependent upon the compositions and proportions of the mixture. Thus, satisfactory results are obtained according to this invention with mixtures comprising $ZrO_2$ within the range from about 80% to 92% (in terms of mole percent, as which all the other percentage figures herein are to be interpreted), $CaO$ within the range of about 2% to 19%, and $MgO$ within the range of about 1% to 18%. Within the foregoing ranges, more preferred proportions are 85%–91% $ZrO_2$, 3%–11% $CaO$, and 2%–10% $MgO$.

Merely as further illustrative of the enhanced utility and adaptability of oxide mixtures in accordance herewith for application to fuel cells of the character to which this invention relates, the resistivities at the various temperatures are noted in the following table for several representative oxide mixtures in accordance herewith:

| Electrolyte oxide mixtures | Resistivity (ohm cm.) | |
| --- | --- | --- |
| | 800° C. | 500° C. |
| 87% $ZrO_2$+6.5% $CaO$+6.5% $MgO$ | 90 | $10^4$ |
| 87.5% $ZrO_2$+7.5% $CaO$+5% $MgO$ | 110 | $1.2\times10^4$ |
| 90% $ZrO_2$+6.5% $CaO$+3.5% $MgO$ | 130 | $2\times10^4$ |

Purely as illustrative, there will now be described a satisfactory manner in accordance herewith for preparing the electrolyte oxide mixtures and the fuel cell structures hereof. The desired quantities and proportions of zirconium oxide, calcium carbonate, and magnesium oxide in powder form are mixed together, and the mixture is compressed and calcined at temperatures of the order of 1800° C. to obtain the desired mixed oxides. The product thus obtained is formed (as by compressing in a mold) into the desired shape, after which it is taken from the mold and sintered or fritted for about 3 to 12 hours at temperatures within the range of about 1850° to 2200° C. The body constituting the electrolyte thus obtained may be readily formed in the particular shape or thickness or density desired, as by molding or otherwise, for example as rather thin slabs or tubes with thin walls.

To facilitate the fritting, some advantages may be gained by adding to the ternary oxide mixture a small amount of a material such as beryllium oxide, preferably not more than about 10% thereof, which provides a eutectic effect with the ternary oxide mixture to lower the melting point thereof.

As will be apparent from the foregoing, there are provided in accordance herewith materials and techniques for obtaining the important advantages of fuel piles formed of solid electrolytes, while still avoiding the disadvantageous characteristics of many solid oxide materials which might be used for such purposes. Thus, the advantages are obtained for industrial and commercial scale uses in a manner which avoids the production of unsatisfactory or impractical electrical or chemical or thermal characteristics.

As further illustrating or emphasizing the advantages and utility of this invention, it may be noted that the solid electrolyte structures hereof are particularly adapted for use in fuel-cell battery construction such as are disclosed in co-pending application Serial No. 280,799, filed May 16, 1963, and based on Swiss patent application No. 6,216/62 filed May 23, 1962.

While the compositions and techniques herein disclosed form preferred embodiments of this invention, it is not limited to these precise compositions and techniques, and changes may be made therein without departing from the scope of this invention which is defined in the appended claims.

What is claimed is:

1. In a fuel-cell battery of the character described for producing electric energy directly from the oxidation of a fuel in said battery and having a pair of electrodes and a self-sustaining solid electrolyte member separating said electrodes, the improvement in which said solid electrolyte member comprises a sintered ternary mixture of stabilized zirconium oxide as a major component with minor portions of calcium and magnesium oxides admixed therewith, said sintered electrolyte member having a resistivity of no more than about 130 ohm cm. at about 800° C.

2. A fuel-cell battery as recited in claim 1 in which said solid electrolyte member also includes up to about 10 mole percent of an oxide in addition to said ternary mixture for forming a eutectic for lowering the melting point of said ternary mixture as an aid in sintering thereof.

3. A fuel-cell battery as recited in claim 2 in which said additional oxide is beryllium oxide.

4. A fuel-cell battery as recited in claim 1 in which said oxides are present in said solid electrolyte member within the mole percentage ranges of about 80% to 92% zirconium oxide, 2% to 19% calcium oxide, and 1% to 18% magnesium oxide.

5. A fuel-cell battery as recited in claim 1 in which said oxides are present in said solid electrolyte member within the mole percentage ranges of about 85% to 91% zirconium oxide, 3% to 11% calcium oxide, and 2% to 10% magnesium oxide.

References Cited

UNITED STATES PATENTS

| | | | |
|---|---|---|---|
| 1,969,099 | 8/1934 | Ryschkewitsch | 106—57 |
| 2,231,945 | 2/1941 | Pole | 106—57 |
| 3,138,488 | 6/1964 | Tragert | 136—86 X |

OTHER REFERENCES

Duwez et al.: Stabilization of Zirconia with Calcia and Magnesia, in Journal of the American Ceramic Society vol. 35, No. 5, May 1, 1952, pp. 111–113.

ALLEN B. CURTIS, *Primary Examiner.*

WINSTON A. DOUGLAS, *Assistant Examiner.*